United States Patent [19]

Walker et al.

[11] Patent Number: 5,360,190

[45] Date of Patent: Nov. 1, 1994

[54] ARCHERY BOW-MOUNTING HOLDER

[75] Inventors: James C. Walker, Lynnwood; Daniel L. Nichols, Puyallup; Claude O. Rawley, Renton, all of Wash.

[73] Assignee: Limrak Industries, Inc., Tacoma, Wash.

[21] Appl. No.: 903,257

[22] Filed: Jun. 23, 1992

[51] Int. Cl.⁵ .......................................... F16M 11/00
[52] U.S. Cl. ........................... 248/201; 224/42.45 R; 224/309; 224/916; 248/316.7
[58] Field of Search ............... 248/309.1, 201, 206.5, 248/316.7; 224/42.45 R, 916, 309, 325; 211/13, 62, 64, 60.1

[56]  References Cited

U.S. PATENT DOCUMENTS

| D. 314,303 | 2/1991 | Glaspie . | |
|---|---|---|---|
| 2,288,442 | 6/1942 | Felton | 248/229 |
| 2,797,852 | 7/1957 | Michalski | 224/42.45 R |
| 3,441,241 | 4/1969 | Brooks . | |
| 4,277,009 | 7/1981 | Bott | 224/309 |
| 4,331,311 | 5/1982 | Russell . | |
| 4,375,268 | 3/1983 | Speck . | |
| 4,474,296 | 10/1984 | Hartman . | |
| 4,531,643 | 7/1985 | Bradley . | |
| 4,542,873 | 9/1985 | Matherly . | |
| 4,747,529 | 5/1988 | Hinderaker | 224/325 |
| 4,754,904 | 7/1988 | Fischer . | |
| 4,915,273 | 4/1990 | Allen . | |
| 4,919,381 | 4/1990 | Buist | 224/42.45 R X |
| 4,957,229 | 9/1990 | Freeman . | |

FOREIGN PATENT DOCUMENTS

| 2434055 | 7/1978 | France | 224/309 |
|---|---|---|---|
| 505769 | 9/1953 | Italy | 248/222.3 |

Primary Examiner—J. Franklin Foss
Attorney, Agent, or Firm—Jack E. Day

[57]  ABSTRACT

A mounting fixture for an archery bow includes a rotatable holder for mounting on a surface, said holder having two resilient fingers extending substantially normal to the surface, with one finger being longer than the other. A limb of the bow is gripped between the two fingers, which converge toward each other except at the tips, where they diverge to facilitate insertion of the limb. The first finger can include a retainer lug on the inner surface, located just below the bend. The holder may include a circular base with the fingers extending from one surface, the base being removably and rotatably fitting into a socket which mounts on the surface, which have lips for receiving the base. The base may contain a magnet to adhere to a magnetizable surface, or it can have apertures spaced from its center, with slots extending arcuately about the center for receiving projections from the surface.

10 Claims, 1 Drawing Sheet

U.S. Patent  Nov. 1, 1994  5,360,190
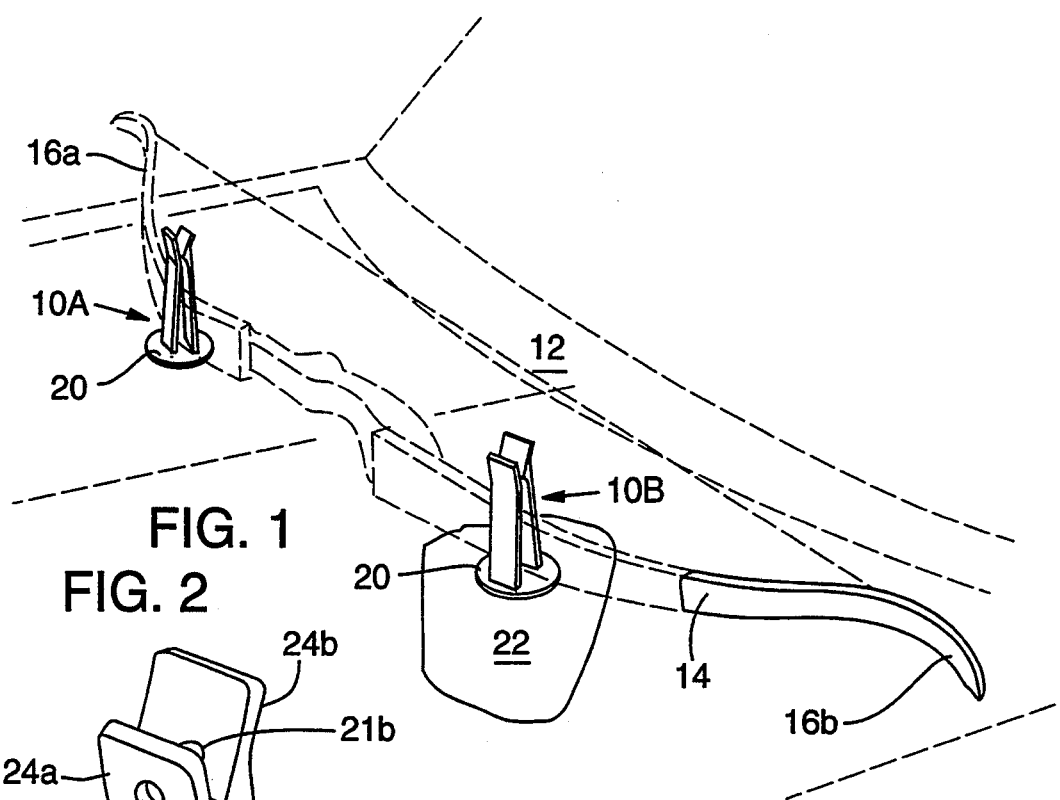
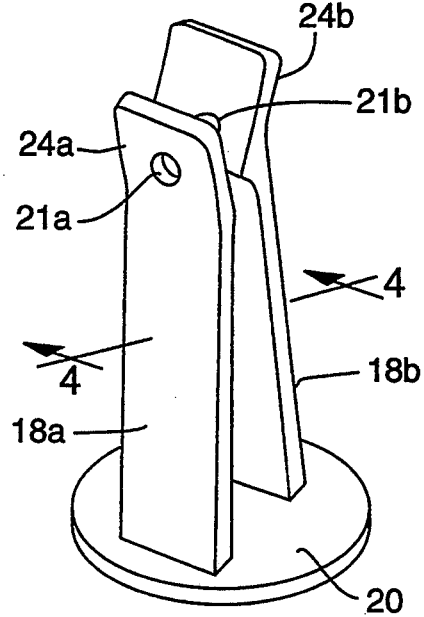
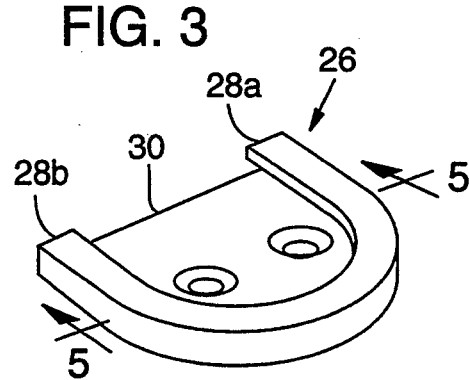
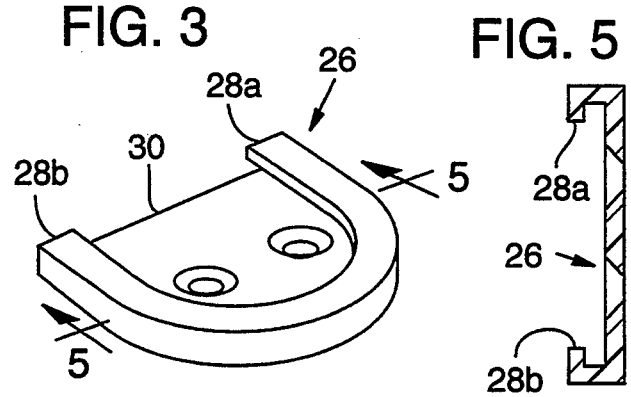
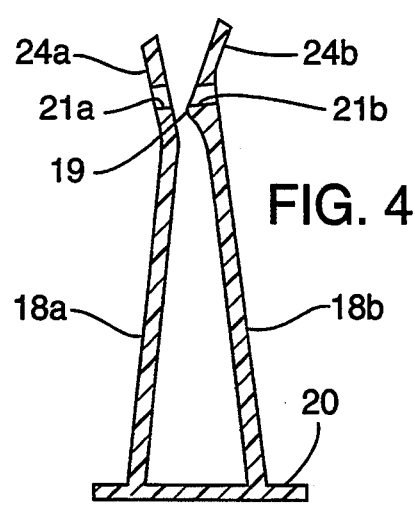

ARCHERY BOW-MOUNTING HOLDER

The present invention relates generally to sporting goods and, specifically, to holders for mounting and storing archery bows on convenient surfaces.

BACKGROUND OF THE INVENTION

Archers have long sought for a means of satisfactorily storing their bows when not in use or while traveling to and from places of use. Placing a bow in a closet or storage room subjects it to the danger of being knocked over or stepped upon, and even standing it on end in a corner can damage the limbs thereof. Placing a bow in the seat or trunk of a car, or the bed of a pickup truck, subjects it to the jolts, jars, vibrations, etc., due to the motion of the vehicle, and can be very damaging to the bow, its finish, sights, strings, or other accessories. What is desired is a means of easily and properly mounting, securing and retaining a bow to avoid damage thereto during storage and transport, is convenient to remove therefrom, and which can be safely located in any convenient spot in a fixed structure or a movable vehicle.

The following references all United States patents are deemed pertinent to the present invention.

Brooks U.S. Pat. No. 3,441,241 (1969) discloses a bow-holder, meant for use on a "stand" (waiting on site for game) or during competition, which permits immediate and noiseless removal of the bow from the holder. It is not intended for the same use as the present invention, nor could it be easily adapted thereto.

Russell U.S. Pat. No. 4,331,311 (1982) discloses a holder for compound bows incorporating pulleys, cams, and/or complex string arrangements. It is not intended for the same use as the present invention, nor could it be easily adapted thereto.

Speck U.S. Pat. No. 4,375,268 (1983) discloses a holder, specifically for mounting umbrellas on or in a vehicle, which depends upon the weight of the umbrella to keep it in the holder. Although it could be adapted for holding a bow, it has no means to keep it from bouncing out of the holders during rough rides, and it has a different structure than the present invention.

Hartman U.S. Pat. No. 4,474,296 (1984) discloses a bow-holder which is intended for use on a stand or in competition, which permits immediate and noiseless removal of the bow. It is intended for a different use and has a different structure than the present invention.

Bradley U.S. Pat. No. 4,531,643 (1985) discloses a holder, primarily for a gun or a fishing rod, which might be modified for use with a bow, and which would permit it to be removed easily and without noise. However, it has an entirely different structure than the present invention.

Matherly et al U.S. Pat. No. 4,542,873 (1985) discloses a holder which permits easy and noiseless removal of a bow therefrom, but is entirely unsuited for the intended use of the present invention, nor could it be easily adapted therefor.

Fischer et al U.S. Pat. No. 4,754,904 (1988) discloses a holder intended for use when an archer is walking or hiking, and allows freedom of movement of hands and arms. It is more complex both to manufacture and to use than the present invention.

Allen U.S. Pat. No. 4,915,273 (1990) discloses a holder for bows or guns which is specifically intended for use with vehicles. It is substantially more complex to manufacture and to use than the present invention.

Freeman U.S. Pat. No. 4,957,229 (1990) discloses a bow-holder intended for use in the cab or bed of a pickup truck. It relies upon the tension of the bowstring to keep the bow in place, and has a different structure than the present invention.

Glaspie U.S. Pat. Des. No. 314,303 (1991) discloses a holder, evidently for fastening to the wall of a building or perhaps inside a recreational vehicle, with provisions for clamping the limbs of a bow. It appears to be substantially more complex to make and adjust than the present invention.

BRIEF DESCRIPTION OF THE DRAWINGS

FIG. 1 is an oblique view of a bow held by the holders of the present invention, mounted on the hood of an automobile.

FIG. 2 is an oblique view of a holder of the present invention.

FIG. 3 is an oblique view of a rotatable socket for retaining a holder of the present invention.

FIG. 4 is a view in cross-section of FIG. 2, along the arts "4—4" therein.

FIG. 5 is a view in cross-section of FIG. 3, along the arrows "5—5" therein.

FIG. 6 is an oblique view of an alternative form of the holder base of the present invention.

DETAILED DESCRIPTION OF THE PRESENT INVENTION

FIG. 1 is an oblique view of holders 10A and 10B of the present invention, mounted on the hood of an automobile 12 (shown in dashed outline), and holding an archery bow 14 (also shown in dashed outline), with limbs 16a and 16b thereof, gripped by said holders 10A and 10B, respectively.

FIG. 2 is an oblique view of one of holders 10A and 10B, disclosing the general structure thereof. As holders 10A and 10B are identical, they will be referred to hereinafter as holder 10, unless it is necessary to distinguish them.

Holder 10 has resilient fingers 18a and 18b extending substantially normal to base 20 thereof, as disclosed in FIGS. 2 and 4. Finger 18a is slightly shorter than finger 18b, and both tilt slightly inward, as they extend upward, for most of their length, except that upper ends 24a and 24b thereof, respectively, bend outward slightly to facilitate easier insertion of limbs 16a and 16b, respectively, of bow 14. Finger 18b has thereon, just below said outward bend, retaining lug 19, as disclosed in FIG. 4, on the inner, or lower, side thereof, shaped to receive limb 16b, and retain it in place. Retaining lug 19 has a gentle slope on the outer, or upper, side and a steeper slope on the inner (lower), or latching, side to retain limb 16b therein, yet sloped enough to yield easily when limb 16b is removed therefrom. Holder 10 can be formed of any material, such as metal or plastic, which has resilient but tough and fatigue-proof properties, so that bows can be stored therein for long periods without aging, crazing or otherwise deteriorating of holder material.

A rubber band or other specially-shaped metal or plastic keeper can be placed over tips 24a and 24b of fingers 18a and 18b, respectively, to more effectively retain bow 14 therein. If desired, apertures 21a and 21b (not shown), can be included in fingers 18a and 18b, respectively, to admit the shackle of a padlock (not shown) to discourage theft.

In the version disclosed in FIG. 1, base 20 may contain a strong magnet, preferably annular in form, which holds holder 10 securely to any substantially plane surface 22 having magnetic properties, and thereby avoiding the drilling of holes in structure, of the hood or roof of a vehicle.

FIG. 3 discloses socket 26, for securely mounting holder 10 on a substantially vertical surface with screws, cement, or other fastening means. This is for mounting bow 14 inside the bed or cab of a pickup truck, or against the wall of a house or other structure. Base 20 slidingly and rotatingly but securely fits within lips 28a and 28b, with open side 30 of socket 26 facing upward.

It will be seen by those skilled in the art that both versions of base 20, i.e., that of FIG. 1 containing a magnet, or that of FIG. 2 sliding into socket 26 of FIG. 3, permit rotating holder 10 therein so that it fits nearly any angle of limb 16a or 16b. Consequently, nearly every style and make of bow 14 can be accomodated by the present invention.

Another alternative for a rotatable mounting structure is disclosed in FIG. 6, where base 20 has apertures 32a and 32b formed therein, each having slots 34a and 34b, respectively, extending arcuately from apertures 32 and 32b so that base 20, and thereby holder 10, can be rotated to desirable angles to accomodate limbs of 16a and 16b of bow 14. This would be useful in those situations where drilled holes in the underlying supporting surface would not compromise the integrity of that surface.

Further, it will be seen by those skilled in the art that fingers 18a and 18b may have soft cushion materials applied to the inner surfaces thereof, so that finished or decorative surfaces on bow 14 will not be marred by insertion in and removal therefrom. Fingers 18a and 18b can have stiffening ribs on the outer surface thereof, if desired or necessary for structural strength. Socket 26 can have flanges, brackets, or other extensions thereon to permit application to inside or outside corners, mouldings, or other than flat mounting locations.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

What we claim as our invention is:

1. A mounting fixture for an archery bow, comprising:
   a. an adjustably rotatable holder for mounting on a surface, said holder having two resilient fingers extending substantially normal to said surface:
      1. a first of said two resilient fingers is longer than a second of said fingers; and
   b. said holder removably gripping and retaining one of the limbs of said bow between said two fingers.

2. The mounting fixture of claim 1, wherein said two resilient fingers converge toward each other, except at the upper ends thereof, where the first of said fingers has a first bend, and the second of said fingers has a second bend, said first and second fingers thereafter diverging to facilitate insertion of said one of said limbs.

3. The mounting fixture of claim 2, wherein said first resilient finger has a retainer lug on the inner surface thereof located just below said first bend.

4. The mounting fixture of claim 1, 2, or 3, wherein said holder has a circular base with said fingers extending from one surface thereof, said base removably and rotatably fitting into a socket which mounts on said surface.

5. The mounting fixture of claim 1, 2, or 3, wherein said holder has a circular base with said fingers extending from one surface thereof, said base containing a magnet.

6. The mounting fixture of claim 1, 2, or 3, wherein said magnet is an annular magnet.

7. The mounting fixture of claim 1, 2, or 3, wherein said holder has a circular base having apertures spaced from the center thereof, and slots extending arcuately about said center from said slots.

8. A mounting fixture for an archery bow, comprising:
   a. a holder having:
      1. a base having two resilient fingers extending therefrom substantially normally to said surface:
         A. a first of said two resilient fingers is longer than a second of said fingers;
   b. a semi-circular socket for mounting on said surface and having lips thereon for receiving said base; and
   c. said holder removably gripping and retaining the limbs of said bow therebetween.

9. A mounting fixture for an archery bow, comprising:
   a. a holder having:
      1. a base having:
         A. two resilient fingers extending therefrom substantially normally to said surface, with a first of said two resilient fingers is longer than a second of said fingers;
         2. a magnet therein for gripping a magnetizable surface;
   b. said holder removably gripping and retaining the limbs of said bow therebetween.

10. A mounting fixture for an archery bow, comprising:
   a. a holder having:
      1. a base having:
         A. two resilient fingers extending therefrom substantially normally to said surface, with a first of said two resilient fingers being longer than a second of said fingers; and
         B. an annular magnet thereon for gripping a magnetizable surface;
   b. said holder removably gripping and retaining the limbs of said bow therebetween.

* * * * *